United States Patent Office 2,870,395
Patented Jan. 20, 1959

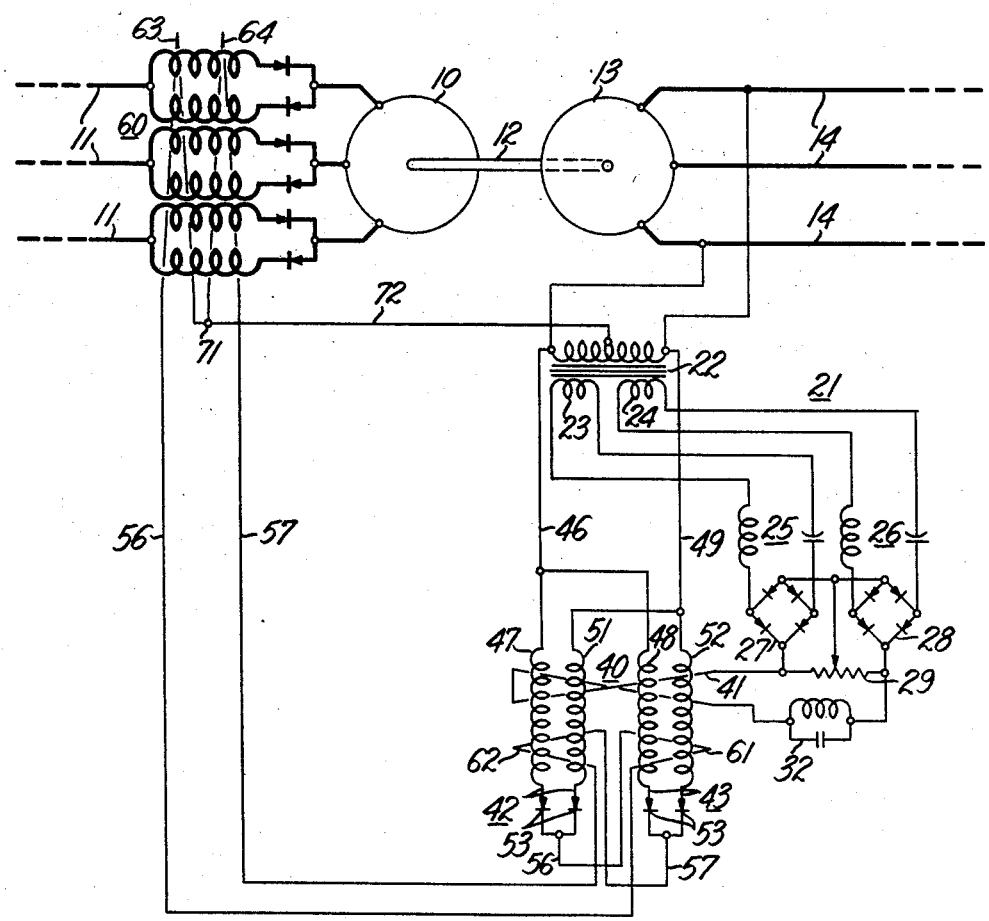

2,870,395

MOTOR GENERATOR SET WITH FREQUENCY CONTROL BY VOLTAGE TO INDUCTION MOTOR

Herbert J. Reinke, West Allis, and Harold A. Gallatin, Wauwatosa, Wis., assignors to Allis-Chalmers Manufacturing Company, Milwaukee, Wis.

Application December 22, 1955, Serial No. 554,783

3 Claims. (Cl. 322—39)

This invention relates generally to motor generator sets and in particular to a system for controlling the output of the generator of a directly connected induction motor generator set.

It has been suggested in the control of generator frequency of motor generator sets that a controllable coupling device be utilized between the motor and generator to function in response to the generator frequency to regulate the system. However, in such a control system the controllable coupling between the motor and the generator is usually provided with some slipping means or clutching means. Greater speed is required of the motor than of the generator to utilize the slipping means as a control element and as a result heat develops due to the friction of the slippage. Adequate clutch coupling and control therefor require space and coolers to accommodate the parts and to dissipate the heat. Further, the clutching means involve working parts that may break or wear thereby adversely affecting the effectiveness or accuracy of the control system.

The disadvantages of the prior suggested systems are avoided in accordance with this invention by providing an induction motor generator set in which the generator shaft is directly connected, integrally or otherwise, to the motor shaft and in which the frequency output of the generator is controlled by static elements to provide extremely close frequency regulation by utilization of magnetic amplifiers responsive to the generator output for varying the speed of a driving induction motor in accordance with the voltage torque characteristics of that motor.

It is an object of this invention to provide an improved motor generator set having a controlled generator output.

Another object of this invention is to provide a more compact motor generator set having reduced space requirements.

Another object of this invention is to provide an induction motor generator set having static type frequency regulating equipment with direct connection, integrally or otherwise, of the motor and generator shafts.

Still another obejct of this invention is to provide an induction motor generator set that can be supported on a common shaft for amplified bearing support and that can be compactly enclosed in a single stator shell.

And still another object of this invention is to provide an induction motor generator set having control means of reduced physical size so that the regulating system can be enclosed compactly as within the end bells of the motor generator housing, if desired.

A further object of this invention is to provide a motor generator set embodying generator frequency regulation by means of magnetic amplifiers utilized directly in the regulation of the speed of the driving induction motor.

Another object of this invention is to provide a motor generator set with an automatic generator frequency regulating system embodying a current limiting means for starting current inrush.

And another object of this invention is to provide a motor generator set in which there is a limit to the amount of current the motor can draw on a short circuit or overload of any of the system components by utilizing the inherent collapse of a self-excited generator to affect the saturation of a voltage control saturable reactor in series with the motor.

Objects and advantages other than those set forth above will be apparent from the following description when read in connection with the accompanying drawing in which the single figure schematically and diagrammatically illustrates circuits and apparatus of a preferred embodiment of the invention.

The motor generator set includes three phase induction motor 10 supplied from a three phase alternating current source 11. That motor is directly coupled as by a common shaft 12 to a three phase generator 13 that supplies, as its output, a three phase alternating current load circuit 14.

The output of the generator, that is the frequency of load circuit 14, is closely controlled. Control is accomplished by detecting a signal of that output and causing that signal to effect a change of the voltage of induction motor 10 which because of its voltage torque characteristics changes the speed of the motor. As a result, the speed of the directly connected generator is varied to return the output frequency of that generator and load circuit 14 to the predetermined value.

The control system includes a frequency detector 21 connected to the output circuit of the generator and magnetic amplifier means 60 connected in series circuit between source 11 and motor 10 to vary the voltage impressed on the motor from the source.

Detector 21 includes control transformer 22, the primary of which is connected across two leads of load circuit 14. This control transformer has two secondaries 23, 24 that supply voltage to resonant circuits 25, 26, respectively. Each of these resonant circiuts is connected in series with a full wave bridge rectifier 27, 28, the output of which is connected in series with a low resistance load resistor 29.

One of these resonant circuits 25 is tuned for resonance at a frequency lower than the predetermined frequency desired of load circuit 14; whereas the other circuit, 26, is tuned for resonance higher than that predetermined frequency. For example, if the desired output frequency is 400 cycles per second, circuit 25 may be tuned for 395 cycles per second and circuit 26 tuned for 405 cycles. Resistor 29 in series with the output terminals of the bridge rectifiers has a low value that the resistance of the resonant circuits may be kept relatively low, thereby providing rather steep slopes for the resonant peaks and enhancing the sensitivity of the detector to any frequency deviation. Resistor 29 is connected in parallel with a control winding 41 and if desired a filter 32 may be provided in circuit with the control winding. One portion of resistor 29 is connected across the D. C. terminals of one bridge rectifier and the balance (other approximate half portion) of that resistor is connected across the D. C. terminals of the other bridge rectifier with the polarities of those two portions opposed. That is, two terminals of the two bridge rectifiers are connected together; while the two output terminals of the bridge rectifiers have the resistor in series therewith. An adjustable slider bridges across the output circuit of the two bridge rectifiers to provide adjustment of the midpoint of resistor 29 to balance the two resonant circuits so that at the desired generator frequency there is no potential difference at the opposite terminals of resistor 29.

Control winding 41 in parallel with resistor 29 is a direct current saturating winding for an intermediate or control amplifier 40. This control amplifier obtains an increase in signal power over the relatively low signal power of detector 21. Power for control amplifier 40 is provided by control transformer 22 and may, as shown, be connected to the terminals of the primary of that transformer. In addition to providing amplification, this control amplifier includes two full wave self-saturating circuits 42, 43, respectively, associated with control winding 41 to provide reversible differential direct current output in response to the reversible signals from the detector. Lead 46 from one terminal of the primary of transformer 22 is connected to two reactance windings 47 and 48 and lead 49 from the other terminal of that primary is connected to reactance windings 51 and 52.

Rectifiers 53 are connected in series with each of the reactance windings effecting self-saturation of the reactors. The anodes of rectifiers in series with reactance windings 47 and 51 are connected together to supply common output lead 56. Similarly, the anodes of rectifiers in circuit with reactance windings 48 and 52 are connected together and supply a common output lead 57. Further, each output lead of the control amplifier has a negative feedback winding connected in series therewith and inductively associated with the other full wave circuit in order to boost the overall differential gain of the control amplifier. Specifically, negative feedback winding 61 is connected in series with output lead 56 and negative feedback winding 62 is connected in series with output winding 57. Control amplifier 40 includes control winding 41 supplied by the frequency detector, and that control winding is associated with the reactance windings so that the control winding current, if one is supplied from the detector, will decrease the output current of one of the full wave output circuits of the control amplifier and at the same time increase the output current of the other full wave output circuit. As the detector is arranged to permit reversal of the current in control winding 41 the action on the amplifier output circuits is reversible.

The two full wave rectified output circuits of the control amplifier individually supply direct current to separate control windings on power amplifier 60. Lead 56 from circuit 42 is connected to control winding 63 and lead 57 is connected to control winding 64. The circuits through these two control windings have a common connection at 71 to lead 72 which is connected to a center tap on the primary of control transformer 22, completing the load circuit of the control amplifier reactance windings. In addition to the D. C. control windings, power amplifier 60 includes three self-saturating double circuits, one in each three phase supply line to motor 10 with both control windings associated with all three of the doubler circuits. However, the control windings oppositely affect the reactors of amplifier, one aiding and the other bucking the reactor fluxes.

The operation of the motor generator set and its control system is as follows. Induction motor 10 being directly coupled to generator 13 is energized from source 11 to be rotated at a speed so that the output of the generator to load circuit 14 is a predetermined frequency, for example 400 cycles. As an example, the control system may utilize the speed match of a generator having 14 poles operating at 400 cycles per second and a motor having two poles operating at 60 cycles per second with the control link between the motor and the generator being the voltage speed torque characteristic of the driving motor that is of the induction motor type.

The inherent instability of induction motors, at any load and under critical low voltages, is transformed into a stabilized and flexible drive by virtue of the speed of response of the magnetic amplifier and the inertia constant of the rotating mass of the motor generator set. The speed control is infinitely variable over the entire slip range of the motor, above the pull out value. Therefore, by keeping the motor speed and applied voltage up to the range of roughly at least 20% of the synchronous speed of the motor, it is possible to obtain a 10% range of regulation of the frequency of the generator.

When the generator frequency is normal, say at 400 cycles per second, the currents in the low and high frequency detector circuits 25 and 26 are equal. Thus, the voltage drops, between the slider and the two ends of the resistor 29, are equal and opposite and no potential difference exits across the end terminals of the resistor and no voltage or D. C. current appears in control coil 41 of control amplifier 40. Consequently, both full wave rectifier self-saturating circuits 42, 43 of the control amplifier have equal currents from their output leads 56 and 57 to the control windings 63, 64 of power amplifier 60. Since these two control windings are arranged on the power amplifier to act in opposition to each other, one aiding and one bucking saturation of the reactor cores, the effect of the control windings with equal currents on the saturable reactor elements cancel each other. As a result, the impedance of the reactance windings of the power amplifiers in series circuit with motor 10 remain unchanged and there is no change in the applied voltage to the motor from source 11. Consequently, the speed of the motor and the generator frequency are not varied.

However, when the generator frequency drops below 400 cycles per second, the low frequency detector circuit 25 approaches resonance while the high frequency detector circuit 26 moves further from resonance. The result is an increase in the current in that portion of the resistor 29 connected to the low frequency detector circuit and decrease in the current of the other portion of the resistor connected to the high frequency detector circuit. Thus, a voltage is applied to control coil 41 of the control amplifier. This results in the output current of one control amplifier output circuit decreasing and the output current of the other output circuit increasing. The flux effect of these control windings on the power amplifier cores is opposed. The resulting effect on the control windings 63, 64 and power amplifier 60 is to change the impedance of the power amplifier reactance windings and the voltage supplied to motor 10 through those reactance windings. Thus, the reactors fire earlier in the cycle to produce a higher average load voltage to motor 10, thereby increasing the speed of the motor and restoring the generator frequency to its predetermined value.

Contrawise, if the generator frequency increases above its predetermined value of 400 cycles per second, the action of the control system is reversed from that described above with respect to a decrease in the generator frequency. That is, the current increases in that portion of the detector resistor connected to the high frequency detector circuit and decreases in the portion of the resistor connected to the low frequency detector circuit. A resultant voltage is applied to control coil 41, producing current in that coil in a direction and polarity reversed from that previously referred to for low frequency output of the generator. This causes a reversal of the effect on the two full wave self-saturating circuits of the control amplifier and on the aiding and bucking control coils of the power amplifier. Positive control ampere turns are decreased and negative control ampere turns are increased. Consequently, the reactors of the power amplifier will fire later in the cycle to produce a lower average load voltage to motor 10, thereby decreasing the motor speed and restoring the directly connected generator speed and frequency to the predetermined value.

By providing power amplifier 60 with the doubler circuit reactance windings in series with the motor windings, the power amplifier constitutes an automatic current limiting means for starting. The reactance characteristics of the power amplifier limit the current inrush on transient disturbances or starting.

Although but one embodiment has been illustrated and described, it will be apparent to those skilled in the art that various changes and modifications may be made therein without departing from the spirit of the invention or from the scope of the appended claims.

It is claimed and desired to secure by Letters Patent:

1. In combination, a source of alternating current, an induction motor having its speed variable in response to variation of the voltage supplied to said motor, a generator, means connecting said generator to be driven by said motor, means including a power amplifier having saturating doubler circuits connecting said source to said motor, each of said doubler circuits including a magnetic amplifier having two half wave rectified reactance windings connected to supply alternating current to said motor, said power amplifier having two control winding means oppositely associated with said reactance windings of each said doubler circuit to vary the saturation of the associated said magnetic amplifier and thereby the impedance to said reactance windings changing the voltage supplied to said motor, a detector reversibly sensitive to variations of the frequency of said generator above or below a predetermined frequency, and means for supplying two signals differentially proportional to the generator frequency variation from said detector to said two control winding means to thereby vary the voltage supplied to said motor and its speed.

2. In combination, a source of alternating current, an induction motor having its speed variable in response to variation of the voltage supplied to said motor, a generator, means connecting said generator to be driven by said motor, means including a power amplifier having doubler saturating circuits connecting said source to said motor, each of said doubler circuits including a magnetic amplifier having two half wave rectified reactance windings connected to supply alternating current to said motor, said power amplifier having first and second control windings oppositely associated with said reactance windings of each said doubler circuit to vary the saturation of the associated said magnetic amplifier and thereby the impedance to said reactance windings changing the voltage supplied to said motor, an intermediate magnetic amplifier having two full wave self-saturating circuits, separate circuit means connecting the output of said full wave self-saturating circuits individually to separate of said control windings, a detector reversibly sensitive to variations of the frequency of said generator above or below a predetermined frequency, said detector having a direct current output winding associated with said intermediate amplifier to oppositely bias said two self-saturating circuts in response to variation of said generator from a predetermined frequency.

3. The combination claimed in claim 2 wherein each of said separate circuit means connecting the output of said full wave self-saturating circuits individually to separate of said control windings includes a feedback winding inductively associated with the other self-saturating circuit to boost the overall differential output of the control amplifier.

References Cited in the file of this patent
UNITED STATES PATENTS

| | | |
|---|---|---|
| 2,512,317 | Edwards et al. | June 20, 1950 |
| 2,555,992 | Ogle | June 5, 1951 |
| 2,610,315 | McKendry et al. | Sept. 9, 1952 |
| 2,711,502 | Alexanderson | June 21, 1955 |
| 2,712,105 | Mathias et al. | June 28, 1955 |